United States Patent
Parker

[11] Patent Number: 6,083,554
[45] Date of Patent: Jul. 4, 2000

[54] FOOD ARTICLE IN THE FORM OF A TACO CHIP

[76] Inventor: LeRoy Parker, 21250 Mahon, Southfield, Mich. 48075

[21] Appl. No.: 09/072,812

[22] Filed: May 5, 1998

[51] Int. Cl.[7] .................... A23B 4/00; A23P 1/00
[52] U.S. Cl. .................. 426/641; 426/513; 426/517; 426/518; 426/523
[58] Field of Search .................... 426/641, 652, 426/442, 513, 512, 517, 518, 519, 520, 523, 802, 808, 810

[56] References Cited

U.S. PATENT DOCUMENTS

| | | | |
|---|---|---|---|
| 3,027,258 | 3/1962 | Mackakis et al. | 99/81 |
| 3,497,363 | 2/1970 | Fox | 99/208 |
| 3,512,993 | 5/1970 | Conley et al. | 99/108 |
| 3,642,496 | 2/1972 | Gibson | 99/107 |
| 3,767,422 | 10/1973 | Levitz | 426/152 |
| 3,865,955 | 2/1975 | Friedman et al. | 426/142 |
| 3,930,056 | 12/1975 | Feminella et al. | 426/646 |
| 4,038,433 | 7/1977 | Manser et al. | 426/615 |
| 4,206,245 | 6/1980 | Drevici et al. | 426/599 |
| 4,320,152 | 3/1982 | Fradin | 426/618 |
| 4,331,692 | 5/1982 | Drevici et al. | 426/310 |
| 4,800,099 | 1/1989 | Gellman et al. | 426/641 |
| 4,822,626 | 4/1989 | Spanier et al. | 426/94 |
| 5,431,950 | 7/1995 | Fuisz | 426/641 |
| 5,464,641 | 11/1995 | Guyot et al. | 426/241 |

*Primary Examiner*—David Lacey
*Assistant Examiner*—Drew Becker
*Attorney, Agent, or Firm*—Harness, Dickey & Pierce, P.L.C.

[57] ABSTRACT

A method of making an edible beef jerky-containing chip is disclosed. The chip is provided in a convenient and ready-to-eat form, and in a manner that is intended at preserving the meat flavor of the chip. The present invention includes a grain product such as wheat, rice, or corn, as well as bits of a meat product. The meat product is preferably beef jerky, although a variety of types of meats may be used.

15 Claims, 1 Drawing Sheet

FOOD ARTICLE IN THE FORM OF A TACO CHIP

BACKGROUND OF THE INVENTION

1. Technical Field

The present invention relates to a food product and method for making the same. More particularly, the present invention relates to a novel method and means for utilizing meat product in a thin crisp of cooked food such as a chip.

2. Discussion

Some time ago edible chips established themselves as a highly desirable snack food for between-meal consumption. Chips offer the convenience of being ready-to-eat and readily storable.

On the other hand, the use of meat and meat products is primarily known for consumption during main courses. Traditionally, meat and meat products, when served at all, are served either as a main dish or as a part of a sandwich or similar food combination. In some cases the meat or meat product may be combined with other components.

For example, U.S. Pat. No. 3,512,993, issued on May 19, 1970, to Conley et al., for "Process for Making a Meat Chip" relates to a meat product with a starch to form a food product.

Also for example, U.S. Pat. No. 3,642,496, issued on Feb. 15, 1972, to Gibson, and titled "Method for Making a Bacon-Containing Food Product" relates to meat, specifically, bacon ends, that are processed and are combined with "a protein filler" which may be "a cereal ingredient."

Furthermore, U.S. Pat. No. 3,865,955, issued on Feb. 11, 1975, to Friedman et al. for "Communited Meat Product Stabilized with Jicama," relates to a meat product which is bacteriologically stabilized with a root vegetable material known as "jicama". This invention teaches the use of a meat product which is combined with another foodstuff for later consumption.

While each of these patents discloses an advancement in the use of a meat or a meat product in combination with another food to form a combined product, room is still available in the art for improvement in the form of a food article which includes meat or a meat product in a convenient, ready-to-eat form.

SUMMARY OF THE INVENTION

The present invention is directed to the preparation of meat products and a chip in a convenient and ready-to-eat form, and in a manner that is intended at preserving the meat flavor once part of the chip. The present invention provides an edible chip or similar foodstuff which includes a grain product such as wheat, rice, or corn, as well as bits of a meat product. The meat product can be of a variety of types of meats, including, for example, pepperoni and beef jerky.

Accordingly, it is an object of the present invention to provide an edible chip which combines meat or a meat product and a grain product.

A further object of the present invention is to provide such an edible chip which is in ready-to-eat form.

Still a further object of the present invention is to provide such an edible chip which may be composed of a variety of meats or meat products.

Yet an additional object of the present invention is to provide such an edible chip which may be composed of a variety of grain products.

An additional object of the present invention is to provide such an edible chip which may be readily prepared.

Still an additional object of the present invention is to provide such an edible chip which may be kept at room temperature for an extended period of time without refrigeration and without loss of flavor or of nutritional qualities.

Other objects and a fuller understanding of the present invention may be had by referring to the following drawing, description and claims.

BRIEF DESCRIPTION OF THE DRAWING

The present invention will be more fully understood by reference to the following detailed description of the preferred embodiments of the present invention when read in conjunction with the accompanying drawing in which FIG. 1 which is a flow diagram illustrating how the edible chip of the present invention may be prepared.

DETAILED DESCRIPTION OF THE PREFERRED EMBODIMENT

Figure 1:
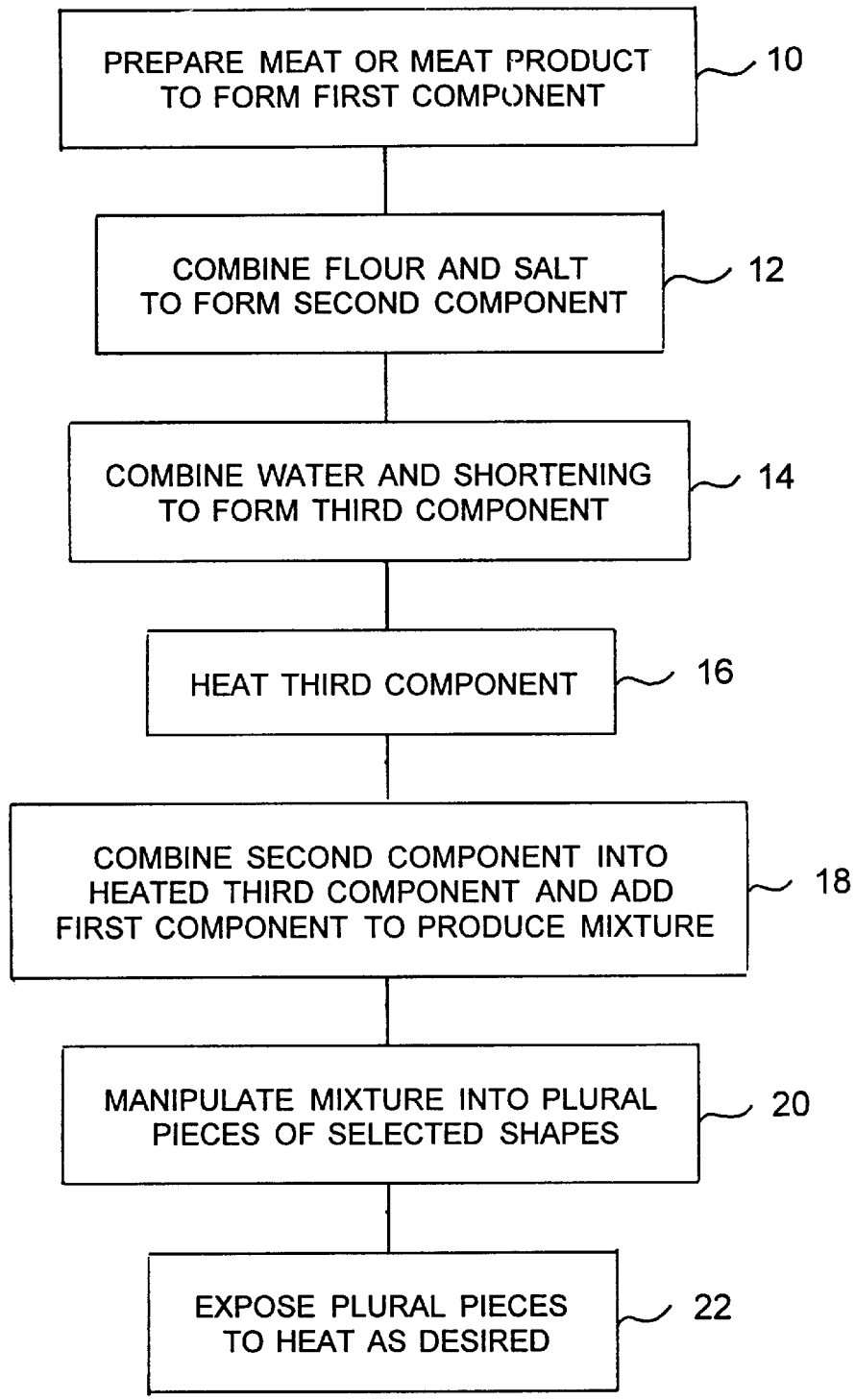

The drawing discloses the preferred embodiment for the production of the present edible chip invention. While the method of preparation according to the illustrated embodiment is preferred, it is envisioned that alternate methods of preparation of the present edible chip invention may be adopted without deviating from the invention as portrayed. The invention is best described by way of a specific example in which a meat is used in the production of an edible chip.

Components

Initially it is to be noted that the amounts appearing in the following description are accorded their application to the equivalent of one serving unit. Larger amounts may be produced as desired by multiplying the suggested amounts.

Between about 5.0 and 50.0 grams of the first component, the meat or meat product component such as beef, is first "jerked" by slicing in thin strips and drying, preferably through exposure to the sun. Other meats, however, might be used, such as pork, although beef is the preferred form of the first component. The first component is set aside for later use.

The second component, the chip-forming grain base, is formed preferably with between approximately 300 and 400 ml of a flour such as masa harina and between about 5 and 15 ml of salt. This preferred flour is made from dried ground corn. Masa harina is readily stored by enclosure in a sealed container or by freezing or refrigeration. Other flours may be used as well. In any event, the flour may also be enriched through the addition of, for example, niacin, reduced iron, thiamine mononitrate (vitamin B1), riboflavin (vitamin B2), and folic acid.

The third component is formed from the combination of a selected amount of water in the amount of between about 250 and 325 ml and a shortening in an amount of between about 5 to 15 ml. While a variety of shortenings may be used, the preferred one is vegetable shortening.

Procedure

In a preferred embodiment of the present invention, and referring to FIG. 1, the following procedures are followed. First, and at step 10, the meat or meat product is cut into strips and is dried in a process known as "jerking." The meat or meat product—the first component—is thereafter set aside for later use. The first component is also cooked as desired.

At step 12, the chip forming grain base is combined with the specified amount of salt to form the second component.

Thereafter, at step 14, the selected amount of water is combined with the selected amount of shortening to form the third component. The third component is heated at step 16 until the water boiled and the shortening melted.

At step 18, the third component is poured into the second component and is blended using known means. The first component is added to the third component to form a mixture.

The mixture, at step 20, is thereafter kneaded on a lightly floured board until smooth. This process typically encompasses about five minutes. The kneaded mixture is then divided into plural pieces, such as twelve in number, and each of the individual pieces is rolled into a ball having a diameter of approximately 2.5 cm. The individual balls are then positioned between wax paper and are flattened therebetween, again using known means, until each ball is paper thin and forms a disc having diameter of about 15.0 cm. Each disc is cut into a plurality (such as eight) individual wedges.

Finally, at step 22, the discs are exposed to heat in the approximate range of 375.0° F. through use of a skillet until browned. This process takes about 60 seconds. The individual wedge-shaped chips may be batch-cooked between one and two minutes.

The method of the present invention assures that the flavor of the meat or meat product will be maintained once part of the chip for a long period of time.

Supplemental Components

In addition to the above basic five components, additional components may be included in the production of the edible chip according to the present invention. For example, and without limitation, flavorings such as cheese and spices may be added as required by taste. In addition, and also without limitation, preservatives such as BHA, BHT, propyl gallate, and/or monoglyceride citrate may be added as required to preserve freshness. Colorings may also be added as required.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

EXAMPLE

According to an example of the present method, the following amounts of individual components were used to prepare a batch of the edible chip of the present invention:

First component: 25.0 g

Second component:
(a) Grain product: 350 ml
(b) Salt: 10 ml

Third component:
(a) Water: 290 ml
(b) Shortening: 10 ml

The method of the Example preparation was as set forth above.

Upon consideration of the foregoing, it will become apparent to those skilled in the art that the various modifications may be made without departing from the invention embodiment herein. Therefore, only such limitations should be imposed as will be indicated by the spirit and scope of the appended claims.

What is claimed is:

1. A method of making a food product comprising the steps of:
    (1) jerking a quantity of meat to form a first component;
    (2) forming a second component by combining a selected amount of a grain product and a selected amount of salt;
    (3) forming a third component by combining a selected amount of water and a selected amount of a shortening;
    (4) heating the third component until the shortening is flowable;
    (5) combining the second component into the heated third component;
    (6) adding the first component to the combined second and heated third components to form a mixture;
    (7) manipulating the mixture into plural pieces of selected shapes by first forming a ball then flattening said ball into a disc which is subsequently cut into individual wedges; and
    (8) browning the plural pieces in a skillet directly after the maniuplation process of step (7).

2. The method of claim 1, wherein said quantity of meat is in an amount of between about 5.0 and 50.0 g.

3. The method of claim 1, wherein said grain product is masa harina.

4. The method of claim 1, wherein said grain product is provided in an amount of between about 300 and 400 ml.

5. The method of claim 1, wherein said salt is provided in an amount of between about 5 and 15 ml.

6. The method of claim 1, wherein said water is provided in an amount of between about 250 and 325 ml.

7. The method of claim 1, wherein said shortening is vegetable shortening.

8. The method of claim 1, wherein said shortening is provided in an amount of between 5 and 15 ml.

9. The method of claim 1, wherein said meat is beef.

10. The method of claim 1, wherein said plural pieces are formed into chips.

11. A method of making a food product comprising the steps of:
    (1) jerking a quantity of meat in the amount of between about 5.0 and 50.0 g to form a first component;
    (2) forming a second component by combining a grain product in the amount of between about 300 and 400 ml and salt in the amount of between about 5 and 15 ml;
    (3) forming a third component by combining an amount of water between about 250 and 325 ml and an amount of a shortening between about 5 and 15 ml;
    (4) heating the third component until the shortening is flowable;
    (5) combining the second component into the heated third component;
    (6) adding the first component to the combined second and heated third components to form a mixture;
    (7) manipulating the mixture into plural pieces of selected shapes by first forming a ball then flattening said ball into a disc which is subsequently cut into individual wedges; and
    (8) browning the plural pieces in a skillet directly after the maniuplation process of step (7).

12. The method of claim 11, wherein said meat is beef.

13. The method of claim 11, wherein said grain product is masa harina.

14. The method of claim 11, wherein said shortening is vegetable shortening.

15. The method of claim 11, wherein said plural pieces are formed into chips.

* * * * *